United States Patent

Nakajima et al.

[11] Patent Number: 5,913,001
[45] Date of Patent: Jun. 15, 1999

[54] OPTICAL CONNECTOR ASSEMBLING ADHESIVE INJECTION PIPE AND METHOD OF ASSEMBLING AN OPTICAL CONNECTOR USING THE SAME

[75] Inventors: Masahiro Nakajima; Yukou Hata; Masahiko Kumaou, all of Koto-ku, Japan

[73] Assignee: Seiko Instruments Inc., Japan

[21] Appl. No.: 08/906,399

[22] Filed: Aug. 5, 1997

[30] Foreign Application Priority Data

Aug. 6, 1996 [JP] Japan ................................. 8-207304

[51] Int. Cl.⁶ ............................ G02B 6/00; G02B 6/36
[52] U.S. Cl. ................................................. 385/80
[58] Field of Search .......................... 385/80–88, 27, 385/31, 39, 51, 52, 144

[56] References Cited

U.S. PATENT DOCUMENTS

| 5,347,698 | 9/1994 | Kinoshita et al. | 29/407.04 |
| 5,379,360 | 1/1995 | Ota et al. | 385/59 |
| 5,394,606 | 3/1995 | Kinoshita et al. | 29/705 |
| 5,420,952 | 5/1995 | Katsura et al. | 385/80 |
| 5,422,971 | 6/1995 | Honjo et al. | 385/80 |
| 5,465,313 | 11/1995 | Belenkiy et al. | 385/80 |

FOREIGN PATENT DOCUMENTS

| 330399A1 | 8/1989 | European Pat. Off. . |
| 745874A2 | 12/1996 | European Pat. Off. . |
| 745874A3 | 12/1996 | European Pat. Off. . |

OTHER PUBLICATIONS

Patent Abstracts of Japan, vol. 10, No. 003 (P–418) Jan. 8, 1996.

*Primary Examiner*—Akm E. Ullah
*Attorney, Agent, or Firm*—Adams & Wilks

[57] ABSTRACT

In an adhesive injection pipe for injecting an adhesive X into a rear end through hole of a ferrule main body, a first stopper portion for positioning in the ferrule main body and a second stopper portion to be engaged with an injecting end of an injector for injecting an adhesive are provided on a cylindrical member having a front end portion to be fitted in the rear end through hole, and a handle member is formed at a rear end of the cylindrical member.

2 Claims, 5 Drawing Sheets

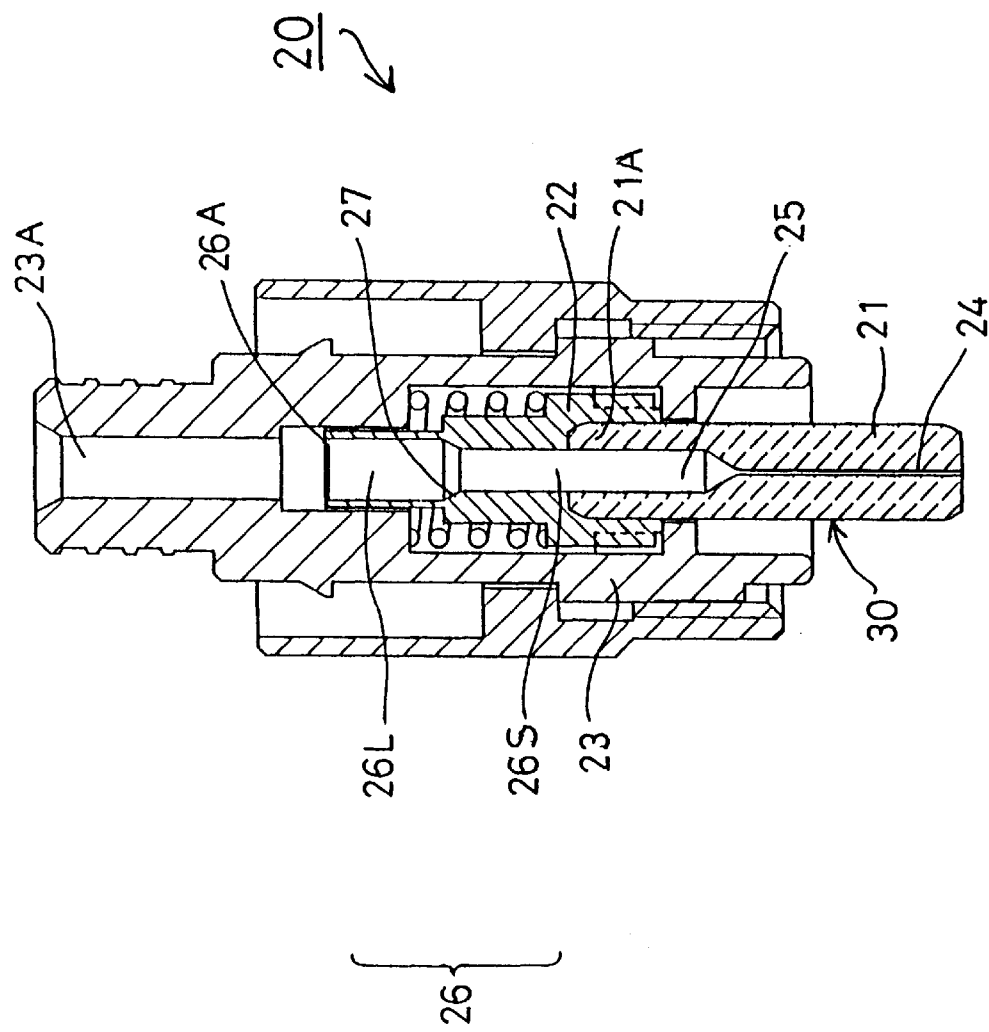

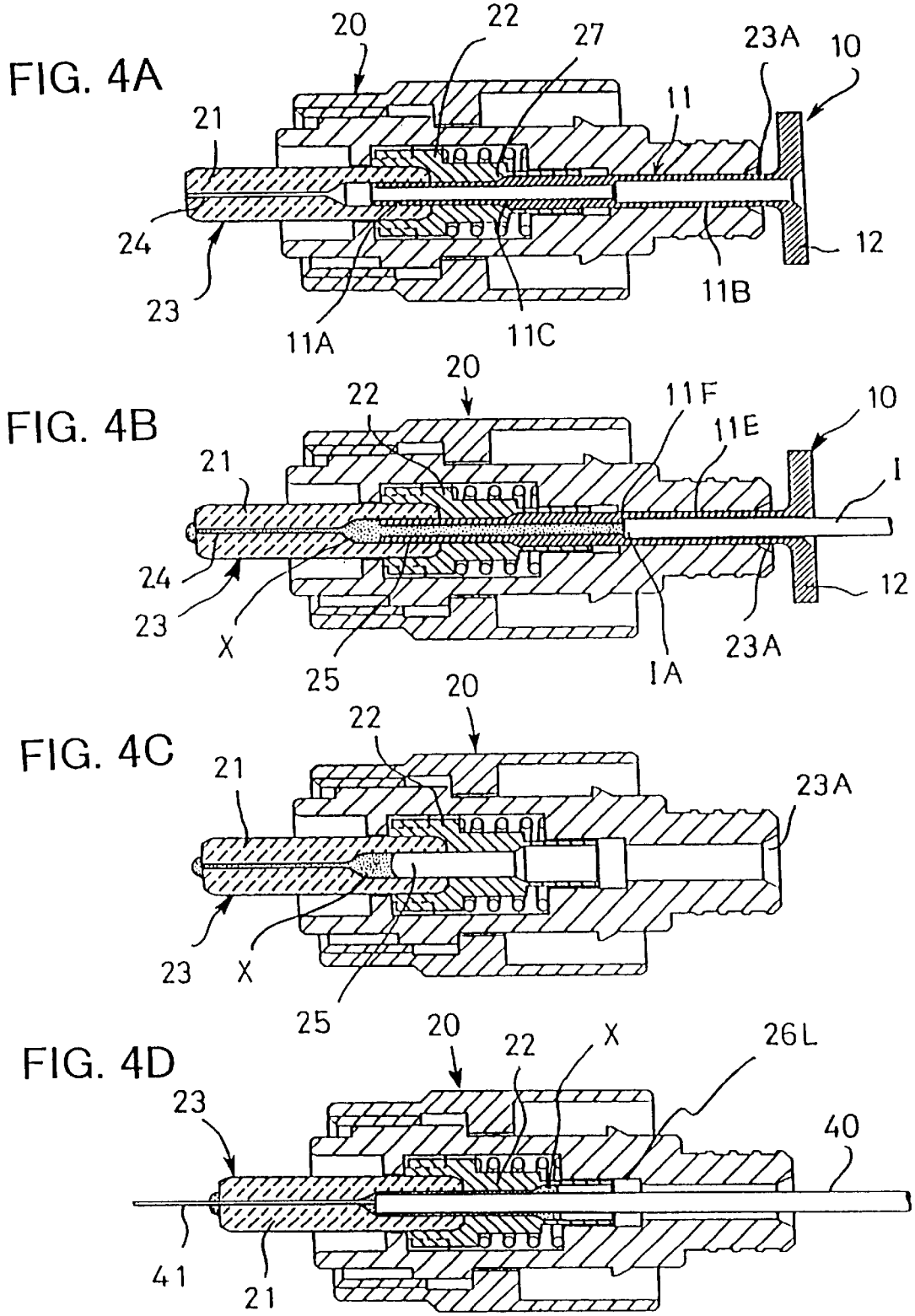

OPTICAL CONNECTOR ASSEMBLING ADHESIVE INJECTION PIPE AND METHOD OF ASSEMBLING AN OPTICAL CONNECTOR USING THE SAME

BACKGROUND OF THE INVENTION

The present invention relates to an optical connector assembling adhesive injection pipe (hereinafter referred to as an adhesive injection pipe) for injecting an adhesive, which is used for adhesion of an optical fiber cable, into a ferrule in a connector when the optical fiber connector is assembled.

Normally, an optical fiber cable is comprised of a bare fiber portion made of thin quartz glass or the like with a diameter of 125 μm and a buffered fiber portion coated with a covering layer of nylon or the like on its circumference and having a diameter of about 1 mm.

When the optical fiber cable is attached to an optical connector, if stress or bending force due to compression or the like is locally applied to the optical fiber connector and the optical fiber cable, optical signals transmitting therethrough receives bad influence to cause transmission losses such as outer leakage or loss increase, and finally the optical fiber cable may be disconnected.

Conventionally, when an optical fiber is fixed to a cylindrical ferrule which is a component for constituting an optical fiber connector and has a through hole at the center, a method of using an adhesive is common, and the optical fiber connector has been constructed as follows.

FIG. 5 is a sectional view showing sequential steps of a conventional method of assembling an optical fiber connector. In the method of assembling an optical fiber shown in FIG. 5, a needle 2 is directly inserted into a rear portion of a ferrule 1. In FIG. 5A, the needle 2 is inserted into the rear portion 1A of the ferrule 1 which is a cylindrical member through which an optical fiber passes, and an adhesive 3 is injected. Next, a buffered fiber 4 with an optical fiber 4F exposed at a front end is inserted from a tail portion of the ferrule 1, and the buffered fiber 4 and the optical fiber 4F are adhered to the ferrule 1 (FIG. 5B).

This prior art has problems that an amount of adhesive must be adjusted while observing the tail portion of the ferrule 1 so that the adhesive does not overflow from the tail portion of the ferrule 1 positioned at a deeper portion in a connector housing 5, and further, since the rear portion 1A of the ferrule 1 is at a deeper portion in the housing of the optical connector, even if the adhesive overflows, a wiping operation can not be carried out. If the overflown adhesive flows into the portion between the rear portion 1A of the ferrule 1 and the housing 5 or the portion where a coil spring 6 is mounted as shown in FIG. 5B, there is caused a problem that the ferrule 1 adheres to the housing 5 so that the ferrule 1 can not move in an axial direction.

Japanese Utility Model Registration No. 3019449 discloses a structure that in order to prevent an epoxy resin from entering into parts movable relatively to one another in an optical fiber connector, a tube is inserted into an optical fiber cable insertion path, the front end thereof is fitted in a recess at the rear end of a ferrule, positioning is carried out to prevent the tube from moving in the insertion path, and then an adhesive is injected from the rear end of the tube.

According to this structure, the injection of the adhesive into the optical fiber cable insertion path of the ferrule is made easy by using the tube. However, this structure has a problem that when the optical fiber cable is inserted into a portion from which the tube was removed after the injection of the adhesive, if the amount of the injected adhesive is too large, a surplus adhesive overflow from the insertion path, so that after all, the adhesive enters into the parts movable relatively to one another in the connector. On the other hand, if the amount of the injected adhesive is made small in order to prevent the adhesive from overflowing, another problem occurs such that there is a tendency to lower the fixing strength of the optical fiber cable is caused. Since the portion into which the adhesive is injected is such a portion that an operator can not observe, it is difficult to inject a suitable amount of adhesive.

An object of the present invention is therefore to provide an adhesive injection pipe by which anyone can easily inject a suitable amount of adhesive for adhesion of an optical fiber cable into a connector for an optical fiber cable. Another object of the present invention is to provide a method of assembling an optical connector using the adhesive injection pipe.

SUMMARY OF THE INVENTION

In order to achieve the above-mentioned object, according to the present invention, in an adhesive injection pipe for injecting an adhesive into a rear end through hole of an optical fiber connector comprising: a cylindrical ferrule main body having a front end through hole for adhering a front end of a buffered fiber and the rear end through hole with a diameter larger than the front end through hole and for insertion of an optical fiber cable; a flange portion disposed at a rear end portion of the ferrule main body and having a hollow hole communicating with the rear end through hole; and a housing portion containing a ferrule formed of the ferrule main body and the flange portion, the adhesive injection pipe is characterized by comprising a cylindrical member having a front end portion to be fitted in the rear end through hole of the ferrule main body; a first stopper portion formed on an outer circumference of the cylindrical member and to be engaged with the flange portion so as to position the front end portion at a predetermined position in the ferrule main body; a second stopper portion formed on an inner circumference of the cylindrical member and to be engaged with an injection end of an adhesive injector so as to position the injection end of the adhesive injector to be inserted from the rear end of the cylindrical member and fitted in the cylindrical member at a predetermined position in the cylindrical member; and a handle member formed at the rear end of the cylindrical member. And in a fabricating method of an optical fiber connector according to the present invention, the connector comprises a ferrule main body, a flange portion, and a housing. The ferrule main body has a first through hole at a front end for fixing an optical bare fiber and a second through hole at a rear end with a diameter larger than said first through hole for disposing a buffered fiber with outer coating on said bare fiber. The flange portion is fixed at a rear end of the ferrule main body and has a through hole which communicates with said second through hole and has a diameter larger than the second through hole at a rear end. The housing accommodates a ferrule which includes the ferrule main body and the flange portion. The method comprises inserting a cylindrical member which has a stepped portion abutting a stepped portion of the through hole of the flange portion, injecting an adhesive into the ferrule main body through the cylindrical member, and inserting the buffered fiber with the front end stripped into the ferrule to fix the fiber in the ferrule after removing the cylindrical member.

According to this adhesive injection pipe and optical fiber connector fabricating method, it is possible to make the relative positional relation between the cylindrical member and the ferrule main body in a predetermined state by such simple operations that the front end portion of the cylindrical member is inserted from the rear end portion of the optical fiber connector to be fitted in the rear end through hole of the ferrule main body, and that the cylindrical member is inserted until the first stopper portion formed on the outer circumference of the cylindrical member is brought into a predetermined engaging state with the flange portion. Next, the injection end of the adhesive injector is inserted into the cylindrical member. In this case, in the similar way, the injection end of the adhesive injector can be easily positioned at a predetermined position in the flange portion by the operation of the second stopper portion.

As a result, the volume of a space defined by the front end portion of the cylindrical member in the ferrule, and the volume of a space defined by the front end of the adhesive injector in the cylindrical member can be easily made predetermined constant values, respectively. That is, by using the adhesive injection pipe, it is possible to easily and certainly inject a necessary constant amount of adhesive into the ferrule.

BRIEF DESCRIPTION OF THE DRAWINGS

FIG. 3 is a sectional view showing an example of an optical fiber connector into which an adhesive is injected by using the adhesive injection pipe shown in FIG. 1.

FIG. 4A–4D is a sectional view showing sequential steps of adhering the optical fiber connector shown in FIG. 3 by using the adhesive injection pipe shown in FIG. 1.

DETAILED DESCRIPTION OF THE INVENTION

A preferred embodiment mode of the present invention will now be described in detail with reference to the drawings.

Figure 1:
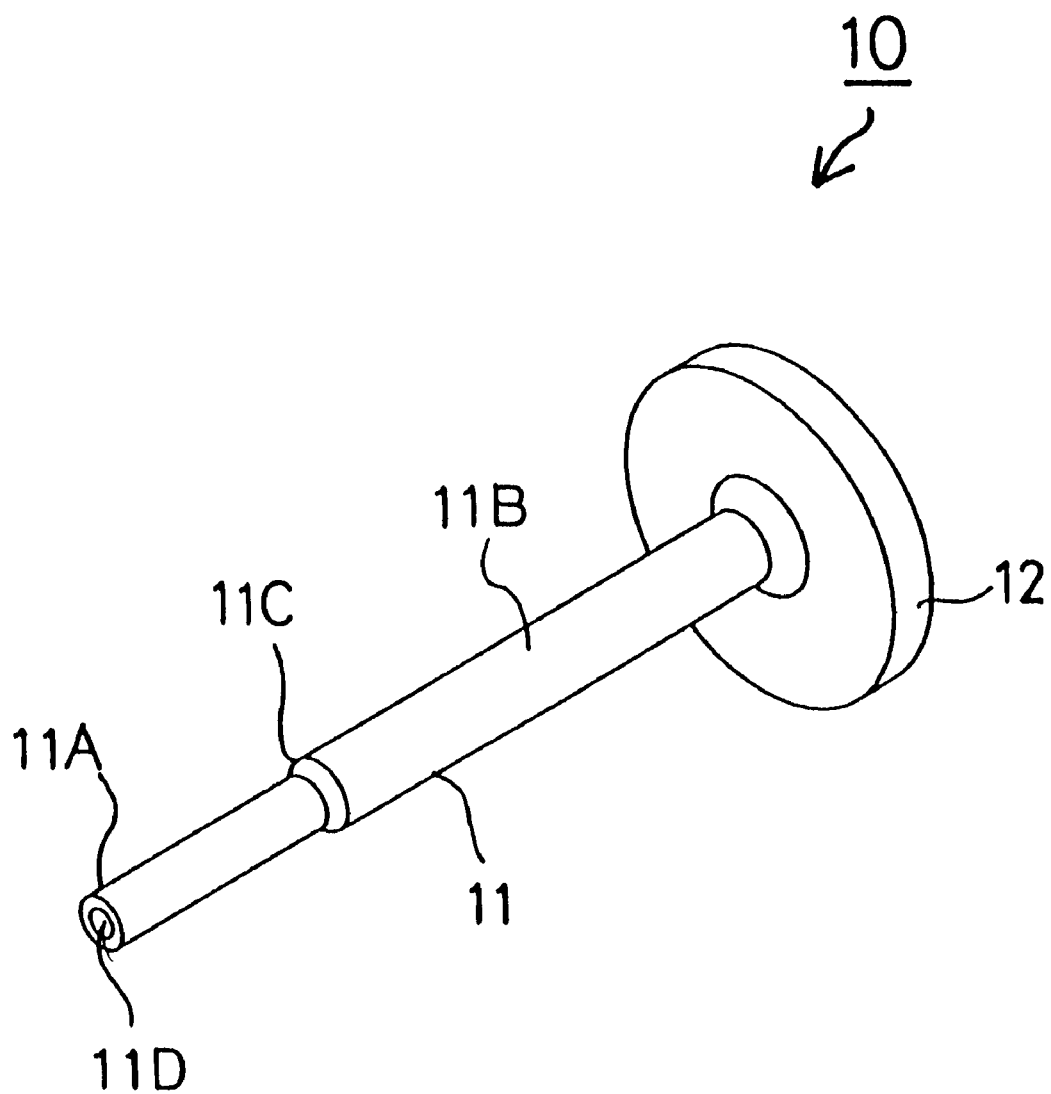
FIG. 1 is a perspective view showing an embodiment of an adhesive injection pipe of the present invention.
Figure 2:
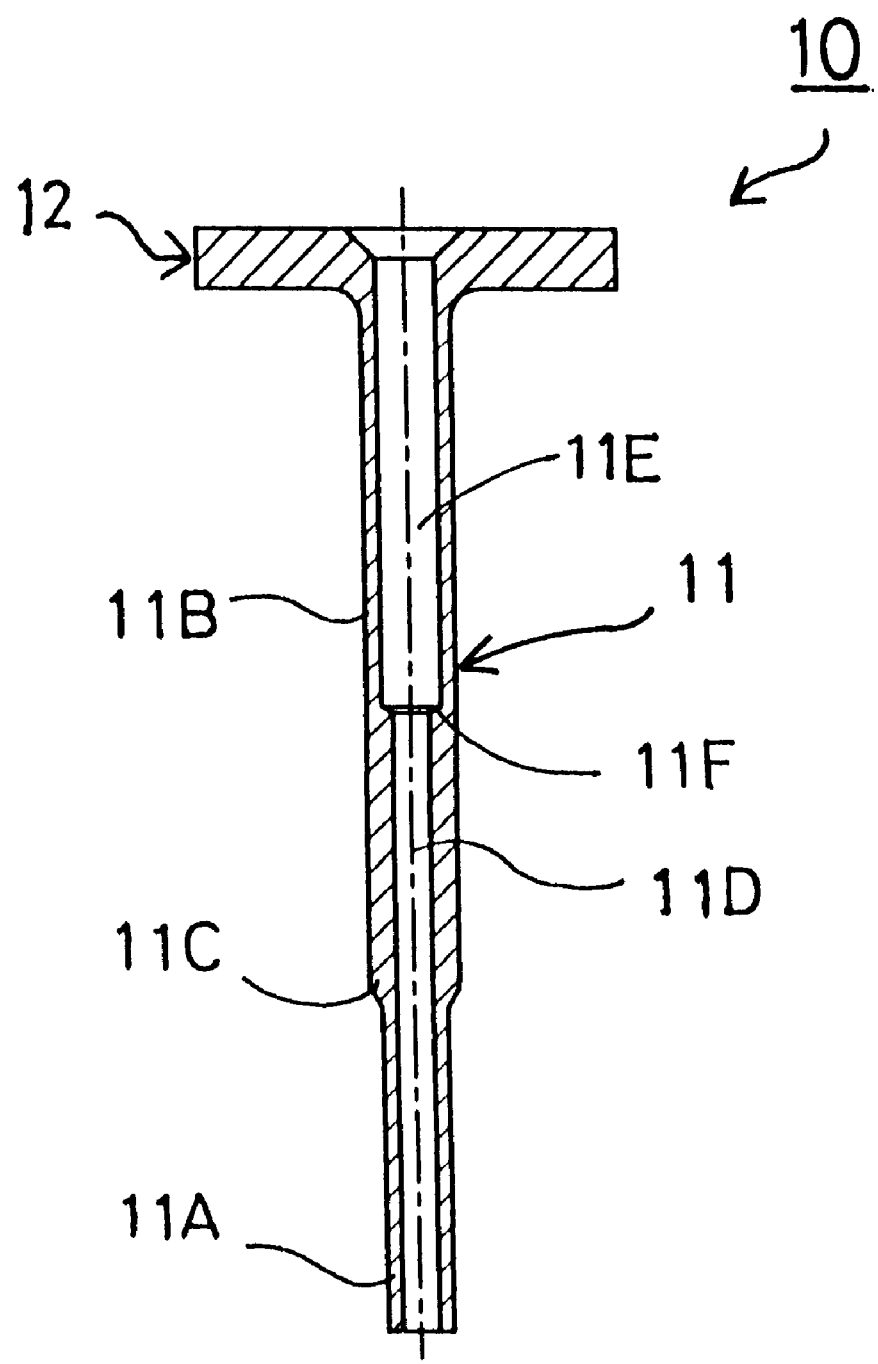
FIG. 2 is a sectional view showing the adhesive injection pipe shown in FIG. 1.
Figure 5A:
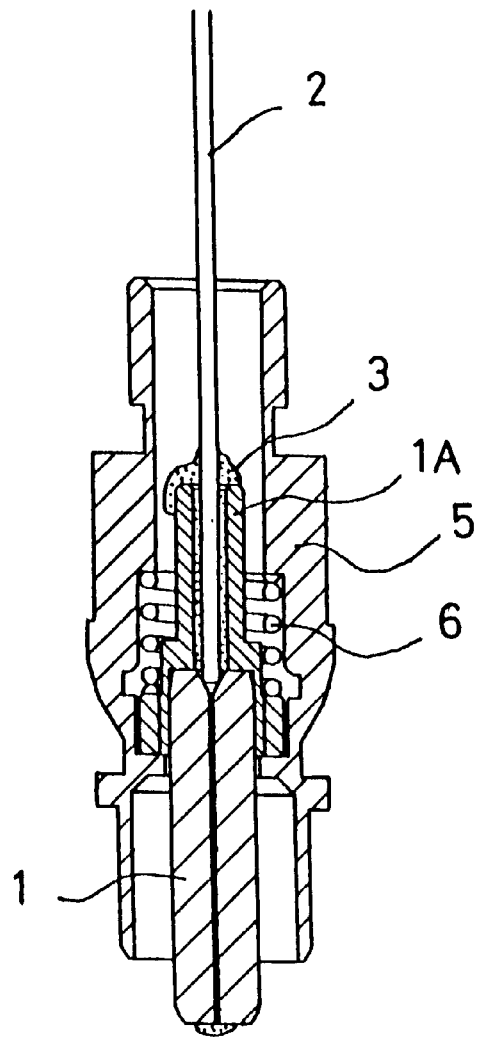
FIG. 5A, 5B is a sectional view of sequential steps, for explaining a conventional method of assembling an optical fiber connector.
Figure 5B:
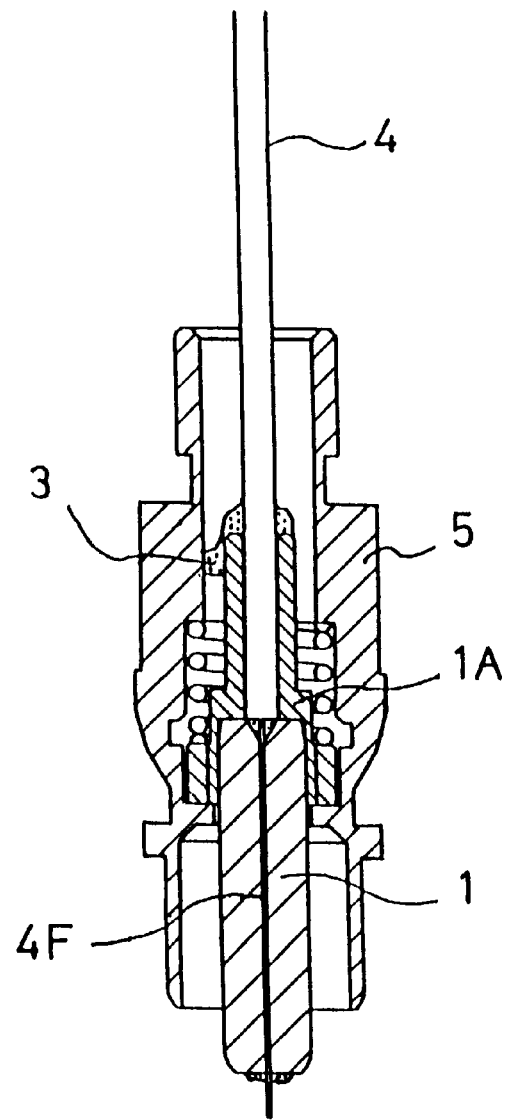

FIG. 1 is a perspective view showing an embodiment of an adhesive injection pipe of the present invention, and FIG. 2 is a sectional view showing the adhesive injection pipe shown in FIG. 1. An adhesive injection pipe 10 shown in FIGS. 1 and 2 is a tool for injecting an adhesive, which is used to adhere an optical fiber cable, into an optical fiber connector. FIG. 3 is a sectional view showing an example of an optical fiber connector into which an adhesive is injected by using the adhesive injection pipe 10.

An optical fiber connector 20 shown in FIG. 3 includes a cylindrical ferrule main body 21 and a flange portion 22 disposed at a rear end portion 21A of the ferrule main body 21. A ferrule 30 comprised of the ferrule main body 21 and the flange portion 22 is contained in a housing portion 23. The ferrule main body 21 includes a front end through hole 24 to adhere a front end of a buffered fiber and a rear end through hole 25 for insertion of an optical fiber cable and having a diameter larger than the front end through hole 24. A hollow hole 26 communicating with the rear end through hole 25 is formed in the flange portion 22 provided at the rear end portion 21A of the ferrule main body 21. Although the diameter of the hollow hole 26 at the side of the ferrule main body 21 is the same as that of the rear end through hole 25, the diameter at the side of an insertion end 26A of the optical fiber cable is larger than that of the hole 25. Hereinafter, the small diameter portion of the hollow hole 26 will be referred to as a small diameter portion 26S, and the large diameter portion thereof as a large diameter portion 26L.

Returning to FIGS. 1 and 2, the adhesive injection pipe 10 is made of a synthetic resin material such as polyethylene, polypropylene, and is comprised of a cylindrical member 11 and a flange portion 12 integrally formed at the rear end of the cylindrical member 11. The cylindrical member 11 includes a small diameter front end portion 11A to be fitted in the rear end through hole 25 of the ferrule main body 21. A base portion 11B of the cylindrical member 11 has a diameter larger than the front end portion 11A, and a shoulder portion 11C is formed between the front end portion 11A and the base portion 11B.

In this embodiment, the outer diameter of the front end portion 11A is slightly smaller than the inner diameter of the small diameter portion 26S, and the outer diameter of the base portion 11B is slightly smaller than the inner diameter of the large diameter portion 26L. Thus, when the adhesive injection pipe 10 is inserted from an opening portion 23A at the rear end of the housing portion 23, the cylindrical member 11 is completely contained in the hollow hole 26, and it can be inserted until the shoulder portion 11C is engaged with a step portion 27 formed between the small diameter portion 26S and the large diameter portion 26L.

That is, the shoulder portion 11C formed at the outer circumference of the cylindrical member 11 serves as a first stopper member, so that the adhesive injection pipe 10 can be certainly positioned always at a predetermined position with respect to the flange portion 22 when the injection pipe 10 is inserted.

An adhesive passage 11D and a container portion 11E, in which a front end portion of an adhesive injector is inserted to be contained, are formed in the inside of the cylindrical member 11. As is understood from FIG. 2, the diameter of the adhesive passage 11D is smaller than the diameter of the container portion 11E, and a shoulder portion 11F is formed between the adhesive passage 11D and the container portion 11E. Accordingly, a front end portion of an injector for injecting an adhesive fitted in the container portion 11E can be pushed until it is engaged with the shoulder portion 11F, so that the shoulder portion 11F serves as a second stopper member capable of positioning the front end portion of the adhesive injector in the cylindrical member 11.

Next, steps of adhering an optical fiber cable 40 through injection of an adhesive into the optical fiber connector 20 by using the adhesive injection pipe 10 will be described with reference to FIG. 4.

In FIG. 4A, the cylindrical member 11 of the adhesive injection pipe 10 is inserted from the opening portion 23A, the front end portion 11A thereof is fitted in the rear end through hole 25, and the cylindrical member is inserted until the shoulder portion 11C is brought into contact with the step portion 27. As a result, the front end portion 11A and a part of the base portion 11B of the cylindrical member 11 are completely contained in the ferrule 30, and the cylindrical member 11 is positioned at a predetermined position with respect to the ferrule 30.

Next, as shown in FIG. 4B, the injection end I of the injector for injecting an adhesive is inserted from the rear end portion of the cylindrical member 11 into the container portion 11E, and is pushed until a front end surface IA of the injection end I is brought into contact with the shoulder portion 11F. Then, a necessary amount of adhesive is injected by an injector main body (not shown), so that the adhesive is filled in the front end through hole 24 and a part of the rear end through hole 25 of the ferrule main body 21. In this case, it is preferable to carry out filling of the adhesive to such a degree that the adhesive slightly overflows from the front end of the front end through hole 24. As is understood from FIG. 4B, the position of the front end surface of the front end portion 11A of the cylindrical member 11 can be made constant, so that the amount of an adhesive x injected into the rear end through hole 25 of the ferrule body 21 can be always made a predetermined constant amount.

The state shown in FIG. 4C is obtained by removing the cylindrical member 11 from the optical fiber connector 20. In this case, since the flange member 12 is integrally formed with the cylindrical member 11, an operator can easily take out the cylindrical member 11 by picking up the flange 12 with fingers.

Next, as shown in FIG. 4D, the optical fiber cable 40 with the exposed buffered fiber 41 at the front end is inserted, and the optical fiber cable 40 can be adhered to the optical fiber connector 20 by the adhesive X. Although the adhesive X extends around the optical fiber cable 40 by the insertion of the optical fiber cable 40, since the amount of the injected adhesive X is controlled to a suitable amount for the above described reason, it is possible to easily prevent the adhesive X from overflowing from the large diameter portion 26L toward the outside. In this way, by using the adhesive injection pipe 10, anyone can easily inject a suitable amount of adhesive into the ferrule 21.

As described above, the position of a front end of a cylindrical member inserted into a ferrule can be positioned at a predetermined position by a first stopper provided outside the cylindrical member, and a front end of an injector can be positioned at a suitable position by a second stopper provided inside the cylindrical member, so that the amount of adhesive injected in the ferrule can be controlled to a suitable amount. Thus, in the case where an optical fiber cable is inserted into the ferrule, there arises no problem such that the adhesive overflows, and furthermore an amount of injected adhesive does not become insufficient, thereby anyone can easily assemble a high quality optical fiber connector.

What is claimed is:

1. An optical connector assembling adhesive injection pipe for injecting an adhesive into a rear end through hole of an optical fiber connector comprising:

a ferrule main body having a front end through hole for adhering a front end of a buffered fiber and the rear end through hole with a diameter larger than the front end through hole and for insertion of an optical fiber cable;

a flange portion disposed at a rear end portion of the ferrule main body and having a hollow hole communicating with the rear end through hole; and a housing portion containing a ferrule formed of the ferrule main body and the flange portion;

the adhesive injection pipe characterized by comprising: a cylindrical member having a front end portion to be fitted in the rear end through hole of the ferrule main body; a first stopper portion disposed on an outer circumference of the cylindrical member and to be engaged with the flange portion so as to position the front end portion at a predetermined position in the ferrule main body; a second stopper portion disposed on an inner circumference of the cylindrical member and to be engaged with an injection end of an adhesive injector so as to position the injection end of the adhesive injector, to be inserted from a rear end of the cylindrical member and to be fitted in the cylindrical member, at a predetermined position in the cylindrical member; and a handle member disposed at the rear end of the cylindrical member.

2. In a fabricating method of an optical fiber connector which comprises a ferrule main body having a first thorough hole at a front end for fixing an optical bare fiber and a second through hole at a rear end with a diameter larger than said first through hole for disposing a buffered fiber with outer coating on said bare fiber, a flange portion fixed at a rear end of said ferrule main body and having a through hole which communicates with said second thorough hole and has a diameter larger than said second through hole at a rear end, and a housing accommodating a ferrule including said ferrule main body and said flange portion, said method comprising: inserting a cylindrical member which has a stepped portion abutting a stepped portion of said through hole of said flange portion, injecting an adhesive into said ferrule main body through said cylindrical body, and inserting said buffered fiber with the front end stripped into said ferrule to fix said fiber in said ferrule.

* * * * *